(12) United States Patent
Kwon

(10) Patent No.: US 11,622,550 B2
(45) Date of Patent: Apr. 11, 2023

(54) AUTOMATIC JERKING DEVICE FOR FISHING

(71) Applicant: Tae Hwa Kwon, Daejeon (KR)

(72) Inventor: Tae Hwa Kwon, Daejeon (KR)

(*) Notice: Subject to any disclaimer, the term of this patent is extended or adjusted under 35 U.S.C. 154(b) by 100 days.

(21) Appl. No.: 15/733,820

(22) PCT Filed: May 2, 2020

(86) PCT No.: PCT/KR2020/005823
§ 371 (c)(1),
(2) Date: Nov. 30, 2020

(87) PCT Pub. No.: WO2021/225183
PCT Pub. Date: Nov. 11, 2021

(65) Prior Publication Data
US 2021/0368759 A1    Dec. 2, 2021

(51) Int. Cl.
*A01K 91/10* (2006.01)
*A01K 97/12* (2006.01)
*A01K 91/06* (2006.01)

(52) U.S. Cl.
CPC ............ *A01K 91/065* (2013.01); *A01K 91/10* (2013.01); *A01K 97/125* (2013.01)

(58) Field of Classification Search
CPC ..... A01K 91/065; A01K 91/10; A01K 97/125
USPC ...................................................... 43/15, 16
See application file for complete search history.

(56) References Cited

U.S. PATENT DOCUMENTS

| | | | | |
|---|---|---|---|---|
| 3,889,413 A * | 6/1975 | Snider | ............... | A01K 91/10 43/15 |
| 4,033,062 A * | 7/1977 | Denecky | ............... | A01K 97/01 43/21.2 |
| 4,212,125 A * | 7/1980 | Kim | ............... | A01K 87/00 43/16 |
| 4,420,900 A * | 12/1983 | Nestor | ............... | A01K 91/065 43/17 |
| 5,473,835 A * | 12/1995 | Emett | ............... | A01K 91/065 43/26.1 |
| 5,524,376 A * | 6/1996 | Flisak | ............... | A01K 97/11 43/21.2 |
| 6,363,650 B1 * | 4/2002 | Beeler | ............... | A01K 91/065 43/19.2 |
| 6,594,940 B1 * | 7/2003 | Dobmeier | ............... | A01K 97/11 43/16 |
| 8,516,739 B2 * | 8/2013 | White | ............... | A01K 91/065 43/4.5 |

* cited by examiner

*Primary Examiner* — David J Parsley
(74) *Attorney, Agent, or Firm* — Heedong Chae; Lucem, PC

(57) ABSTRACT

The present invention relates to an automatic jerking device for fishing, and more particularly, to an automatic jerking device for fishing, which has a biting signal detection member for detecting a biting when a fish bites a bait during fishing, and automatically performs a jerking to catch the fish at a proper timing.

10 Claims, 11 Drawing Sheets

AUTOMATIC JERKING DEVICE FOR FISHING

BACKGROUND OF THE INVENTION

1. Field of the Invention

The present invention relates to an automatic jerking device for fishing, and more particularly, to an automatic jerking device for fishing to have a biting signal detection member for detecting a biting when a fish bites a bait during fishing, and automatically perform a jerking to catch the fish at a proper timing.

2. Description of the Related Art

During fishing, when a bite occurs, that is, when a fish hits a bait hooked by a fishing hook, a user generally checks the situation with eyes, performs a jerking, which is an action of lifting a fishing rod upward instantaneously after several bites, to enable the fishing hook to be properly caught in a mouth of the fish, and winds a reel to pull the fish over the surface.

There is a difference between an experienced user and a beginner, such as an accurate confirmation on bites of the fish, a jerking timing after the confirmed bite, and a force and a speed required for the jerking.

In other words, the experienced user can know that a bite occurs based on a force of a fishing line descending into the water and a movement of a fishing float. However, since the beginner cannot exactly know whether a bite occurs or not, there may be unnecessary jerking. Thus, a fatigue increases and the user does not feel a fun of fishing.

In addition, even when the experienced user continuously keeps eyes on the fishing float, an eye strain is caused. In addition, when the user is away for a while due to physiological phenomena such as urine, the timing for jerking may be missed, thereby wasting only the bait. Korean Patent Registration No. 10-0254052 (registered on Jan. 28, 2000) discloses a related art to solve the problems. The above related art proposes "SNATCH JERK DEVICE FOR FISHING ROD"

The above related art relates to a jerking device provided in a cradle for supporting a fishing rod, and is designed to automatically jerk the fishing rod rearward simultaneously upon a biting signal.

Since the fishing rod cradle performs the same action of holding the fishing rod rearward, it cannot be used while the fishing rod is held by hand.

In addition, the above jerking device in the related art cannot control whether to perform the jerking according to the biting strength.

The inventor has designed an automatic jerking device capable of automatically jerking in various fishing postures, such as holding a fishing rod by hand or supporting the fishing rod, and capable of adjusting the sensitivity for performing the jerking.

SUMMARY OF THE INVENTION

The present invention is proposed to solve the above problems, the present invention provides an automatic jerking device for fishing to detect a biting signal and automatically perform a jerking when a fish bites a bait during fishing so as to prevent missing the fish.

In addition, the present invention provides an automatic jerking device for fishing to adjust the sensitivity of detecting a bite of a fish according to target fish species and fishing environments so as to be used in various conditions.

In addition, the present invention provides an automatic jerking device for fishing, which has a notification mechanism to inform a user of a bite of a fish.

In order to solve the above technical problems, the present invention at least includes a biting signal detection member rotated by a bite of a fish, a trigger operated by the rotation of the biting signal detection member, a latch mounted on the trigger, a towing hook for pulling a fishing line, and an elastic wire for pulling the latch and the towing hook.

Meanwhile, the present invention further includes a rotation switch disposed between the biting signal defection member and the trigger, and the rotation switch is configured to hold or release a movable stick of the trigger according to a rotation angle.

The present invention configured as described above detects the bite, which is important in fishing, and automatically performs the jerking at the optimal timing to prevent the bait from being snatched, so that the efficiency of fishing can increase.

In addition, the response sensitivity for a bite of a fish, the jerking strength and the jerking length are adjustable according to target fish species and fishing environments, so that the utilization can be improved, and the structure can be simplified to lower manufacturing costs, so that the price competitiveness can be increased.

Meanwhile, when a jerking occurs, the jerking is displayed to the outside through the notification mechanism, and simultaneously, the signal is transmitted to a preset terminal to induce the user to return to the fishing place, so that a fish can be prevented from being missed.

DETAILED DESCRIPTION OF THE INVENTION

Figure 1:
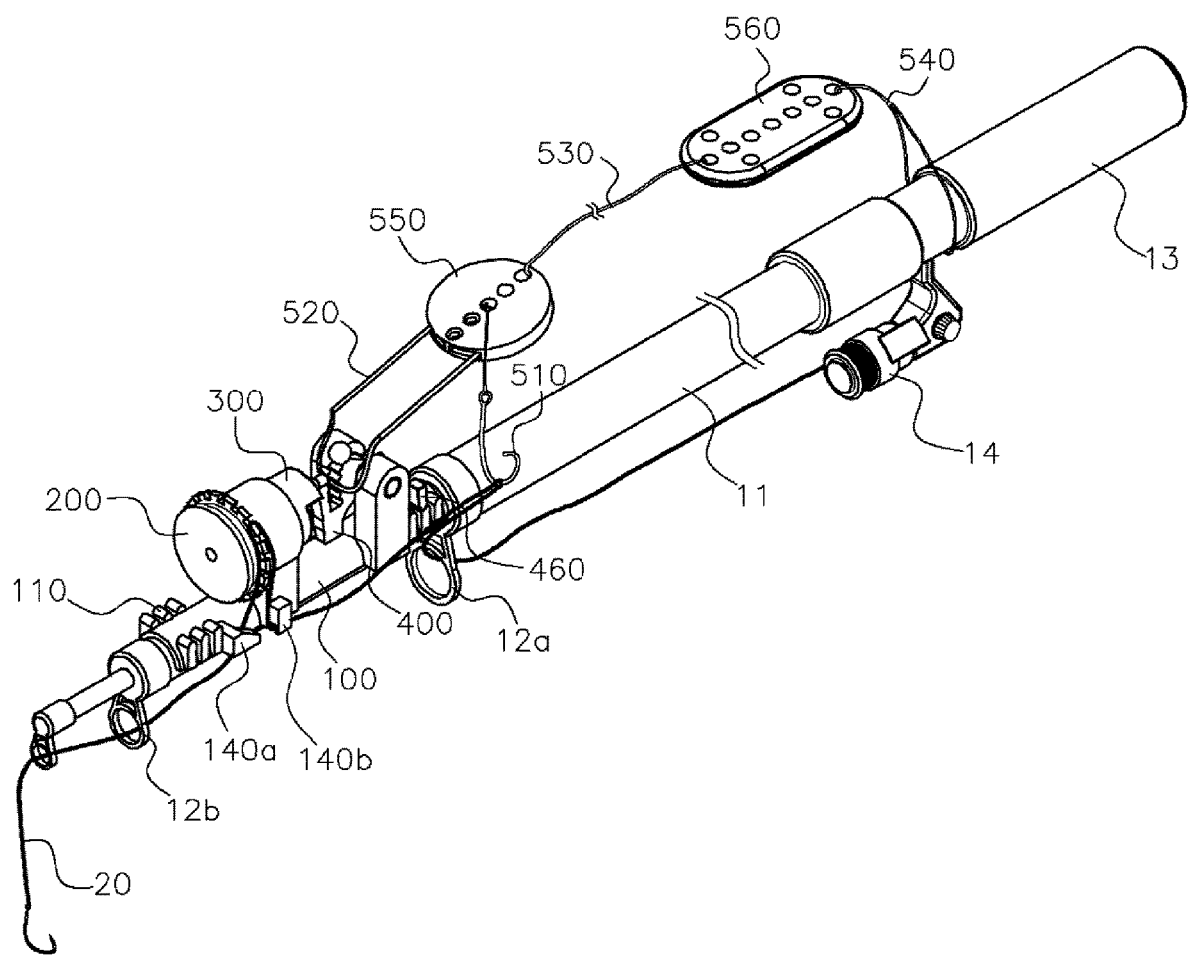
FIG. 1 is an exemplary view showing an automatic jerking device for fishing of a first embodiment according to the present invention.
Figure 2:
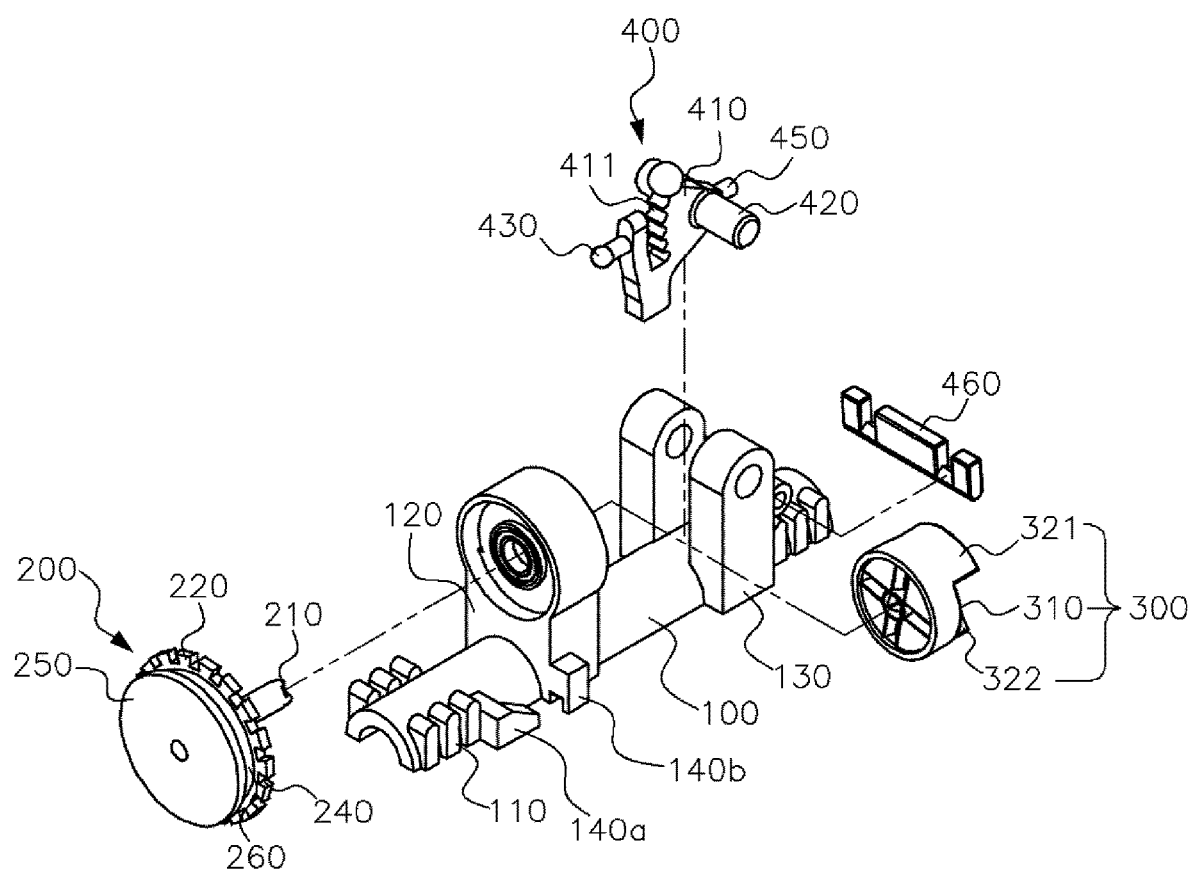
FIG. 2 is an exploded perspective view of a biting signal detection member of the first embodiment.

Hereinafter, an automatic jerking device of the best mode according to the present invention will be described based on FIGS. 1 to 6.

An automatic jerking device of a first embodiment according to the present invention includes a base 100, in which the base 100 is provided with a first shaft support portion 120 and a second shaft support portion 130.

A biting signal detection member 200 and a trigger 400 are rotatably installed to the first shaft support portion 120 and the second shaft support portion 130, respectively.

The biting signal detection member 200 is rotatably supported by the first shaft support portion 120, in which a rotation switch 300 is provided at the other end of a first rotation shaft 210 of the biting signal detection member 200, and a trigger 400, which is separated and rapidly retracted rearward by a contraction force of an elastic wire 530 stretched according to a rotation amount of the rotation switch 300, is mounted to the second shaft support portion 130.

The base 100 includes a coupling portion 110 that securely fixes a lower end of the base 100 to a fishing rod 10. As shown in FIGS. 4(A), 4(B) and 4(C), the coupling portion 10 is provided in the form of a plurality of coupling grooves, and the silicone wires 111 are inserted into the coupling grooves, respectively, so that the base 100 is fixed to the fishing rod 10. In other words, the silicon wire 111 is inserted into the coupling groove while having a diameter thinned by the tensile force, and is seated in the coupling groove while having a diameter increased when the tensile force is released. The present invention uses the lengthwise elongation by the tensile force of the silicon wire 111 and the expansion of the diameter by the restoring force.

The base 100 includes the first shaft support portion 120 provided parallel to the fishing rod 10 and the second shaft support portion 130 spaced apart from the first shaft support portion 120 at a predetermined interval.

The biting signal detection member 200 is rotatably mounted to the first shaft support portion 120, in which at least one protrusion 240 is formed on an outer circumference of the biting signal detection member 200. The protrusion 240 is configured such that a fishing line 20 is hung thereon. When a bite occurs while the fishing line is placed on the protrusion 240, the fishing line 20 pulls the protrusion 240 and the fishing line rotates the biting signal detection member 200 around the first shaft support portion 120.

The rotation switch 300 coupled to the biting signal detection member 200 is provided on the rotation shaft 210 of the biting signal detection member 200 so as to rotate integrally with the biting signal detection member 200.

The biting signal detection member 200 may be formed with the protrusions 240 at predetermined intervals on an outer circumference of a disc 220, the fishing line 20 may be placed thereon, and the biting signal detection member 200 may be supported and rotated on the first shaft support portion 120 by the force of the fishing line 20 pulled by a fish.

The rotation switch 300 includes an opening portion 310 and a blocking portion 320, in which the blocking portion 320 includes a first blocking portion 321 having a small inner diameter of the blocking portion because being thick with respect to a hollow shaft center, and a second blocking portion 322 having a large inner diameter of the blocking portion because of being thin with respect to the hollow shaft center, so that the sensitivity of the rotation switch 300 may be selected. In other words, in a front end of the trigger, a frictional force is generated between a movable stick 430 and a contact surface of the blocking portion in proportion to the inner diameter of the blocking portion. Accordingly, when the movable stick is used in contact with the blocking portion having the large inner diameter, the frictional force is greatly applied, so that the reaction sensitivity by bite becomes lowered. The trigger 400 includes a second rotation shaft 420 freely rotatably coupled to the second shaft support portion 130, a rotation member 410 rotated together with the rotation of the second rotation shaft 420, and formed on an outer periphery thereof with a latching protrusion 411, and a movable stick 430 formed at a front end of the rotation member 410.

Preferably, a plurality of latch protrusions 411 are formed on the outer periphery of the rotation member 410, so that the latch protrusions 411 may be selected and used suitably for target fish species or environments. The latch protrusion 411, on which a latch 520 of a jerking member 500 is placed, determines whether the rotation member is rotated, according to a latched position on the latch protrusion 411. In other words, as the latch protrusion 411 rises upward from the second rotation shaft 420, the rotational force increases. On the contrary, when the latch 520 is coupled to a lowermost latch protrusion 411, the latch protrusion 411 is portioned below the second rotation shaft 420, and accordingly, a downward rotational power is generated, so that the jerking force is not generated. Accordingly, upon preparing for fishing, the latch may be latched to the latch protrusion 411 at the position for generating the downward rotation power.

The elastic wire 530 has a rear end fixed to a grip 13 or a reel 14 of the fishing rod and a front end extending to the latch 520 and a towing hook 510, in which the latch 520 and the towing hook 510 are caught in the latch protrusion 411 of the triggers 400 and the fishing line 20, respectively.

The present invention is configured to detect the biting signal and perform the jerking regardless of the rotation direction of the biting signal detection member 200, and enables the jerking not only when the fishing line is pulled, but also when the fishing line is loosened. A reverse rotation of the biting signal detection member 200 is generated by mounting a weight on the protrusion 240 formed on the disc 220 or fastening one end of a rubber wire, which has the other end fixed to the base 100, to the protrusion 240, so that the jerking is performed not only when the fishing line is pulled, but also when the fishing line is loosened.

FIG. 1 shows an example of a preparation step of the present invention.

After the automatic jerking device for fishing of the present invention is placed on an upper end of the fishing rod 10, the base 100 is fixed to the fishing rod 10 by using the coupling portion 110. The automatic jerking device is disposed between a first butt guide 12a and an adjacent second butt guide 12b provided on the fishing rod 10. Thereafter, the fishing line 20 between the first butt guide 12a and the second butt guide 12b is ready after hooked to the towing hook 510 of the automatic jerking device.

Next, the fishing line 20 of the fishing rod is hung on the protrusion 240 of the biting signal detection member 200. After the movable stick 430 of the trigger 400 is mounted through the opening 310 of the rotation switch 300, the movable stick 430 is blocked by the blocking portion 320 of the trigger 300, thereby prevent the separation. Next, a rear end of the elastic wire 530 is fixed to the grip 13 of the fishing rod, and a front end of the elastic wire 530 is connected to the towing hook 510 and the latch 520. The elastic wire 530 is connected to the towing hook 510 and the latch 520 by a connection portion 550.

While the latch 520 connected to the front end of the elastic wire 530 is mounted to the latch protrusion 411 of the trigger 400, the elastic wire 530 is tensioned and fixed to a rear of the fishing rod, preferably to the grip 13 or the reel 14.

The fishing line 20 is spanned between a first guide 140a and a second guide 140b, and the intermediate fishing line 20 is caught by the protrusion 240 formed on the disc 220 of the biting signal detection member 200. In addition, the fishing line 20 caught by the protrusion 240 is seated along an outer circumferential groove 260 formed between the protrusion 240 and a spool 250.

The spool 250 is coupled to the biting signal detection member 200 through a bolt type so as to be loosened or tightened when rotated, thereby adjusting the frictional force between the first shaft support portion 120 and the disc 220, so that the response sensitivity of the biting signal detection member 200 may be adjusted with respect to a bite of a fish.

When the fishing line is pulled by the bite of the fish, the rotation switch 300 is rotated together with the biting signal detection member 200 to separate the trigger 400 from the rotation switch 300, the trigger 400 is pulled by the elastic force, the latch 520 caught by the latch protrusion 410 of the trigger 400 moves rearward through the elastic force of the elastic wire 530, and the towing hook 510 simultaneously pulls the fishing line rearward. Thus, the jerking is achieved.

Figure 3:
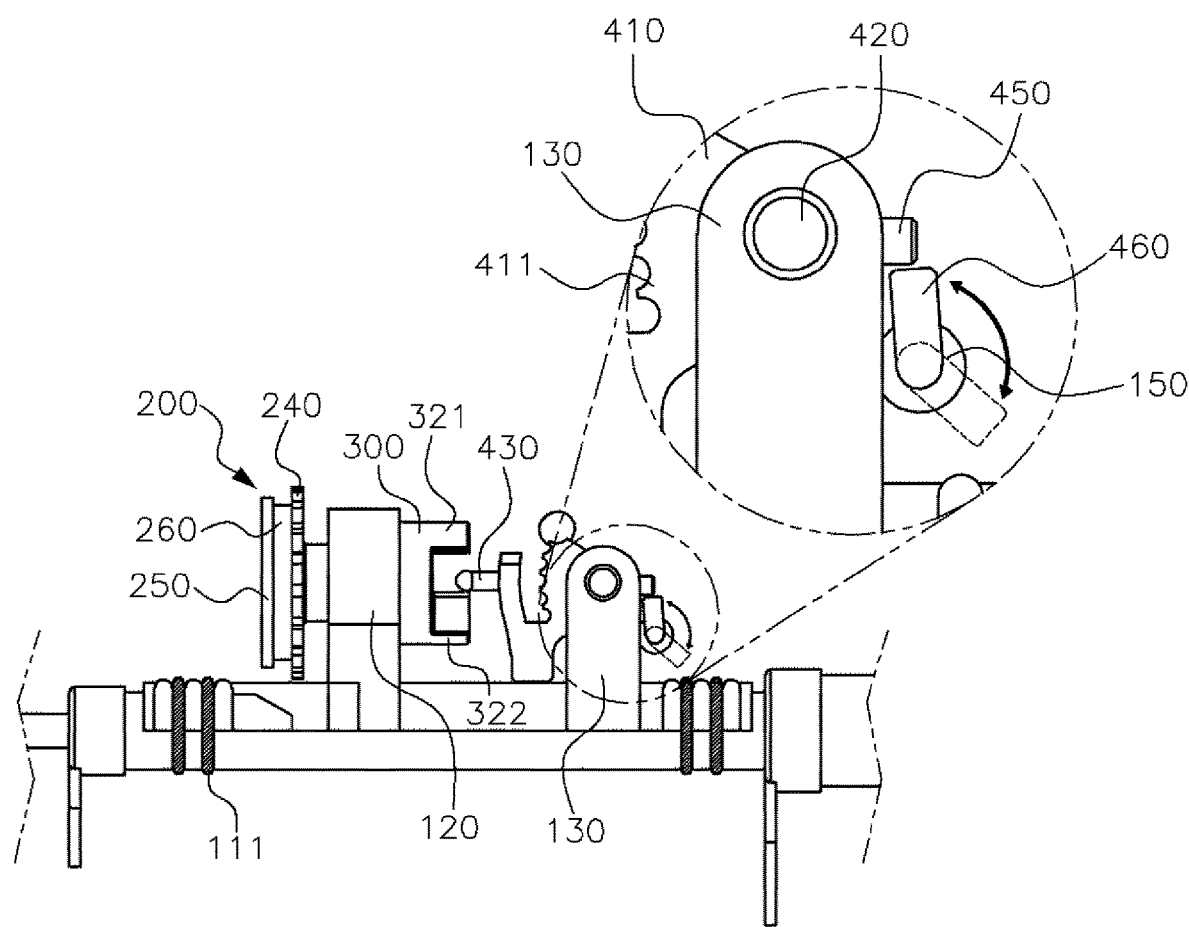
FIG. 3 is a view showing a using example of the automatic jerking device for fishing of the first embodiment.
Figure 4:
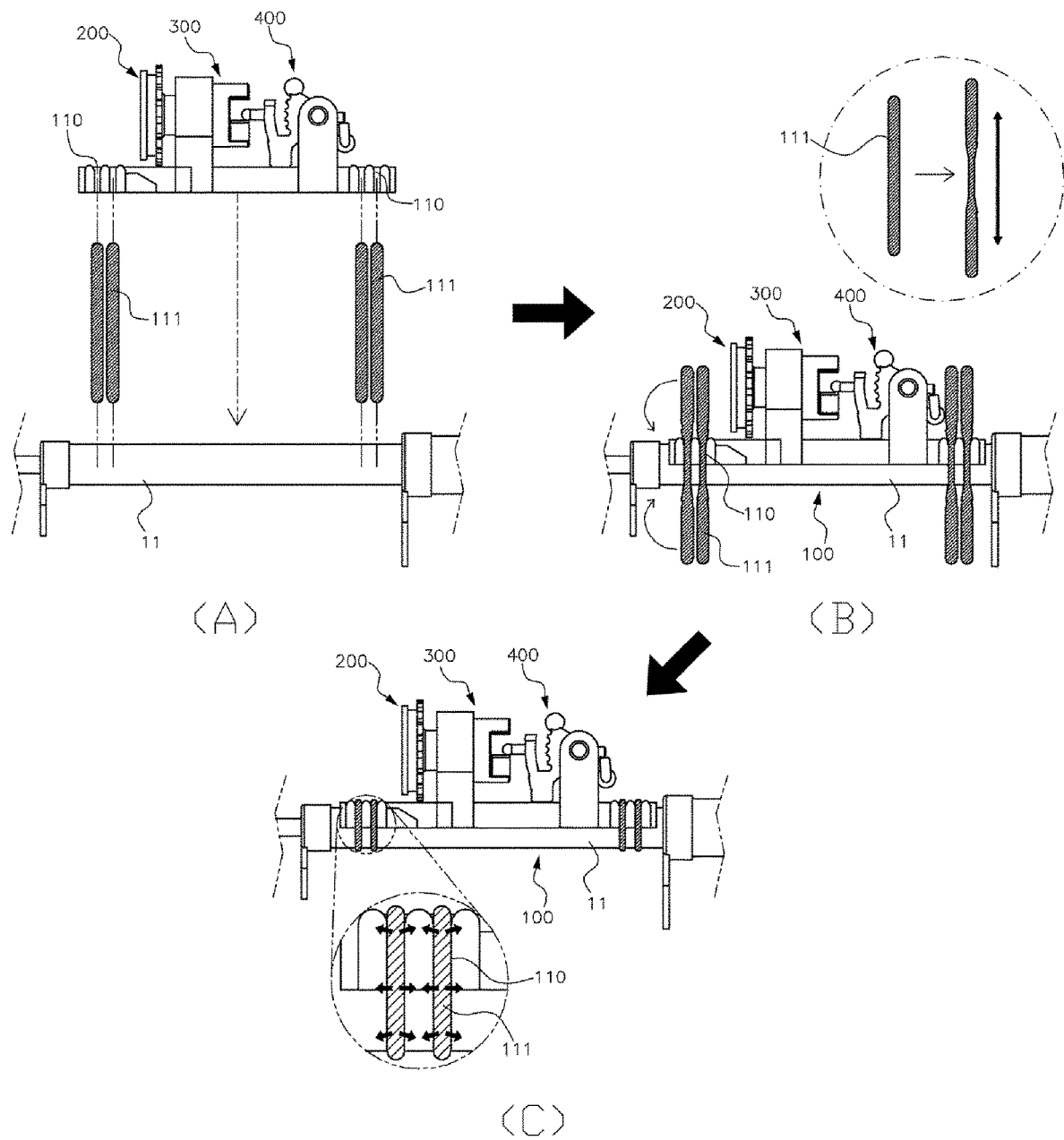
FIG. 4 is a view showing a coupling structure of a coupling portion in the first embodiment.
Figure 5:
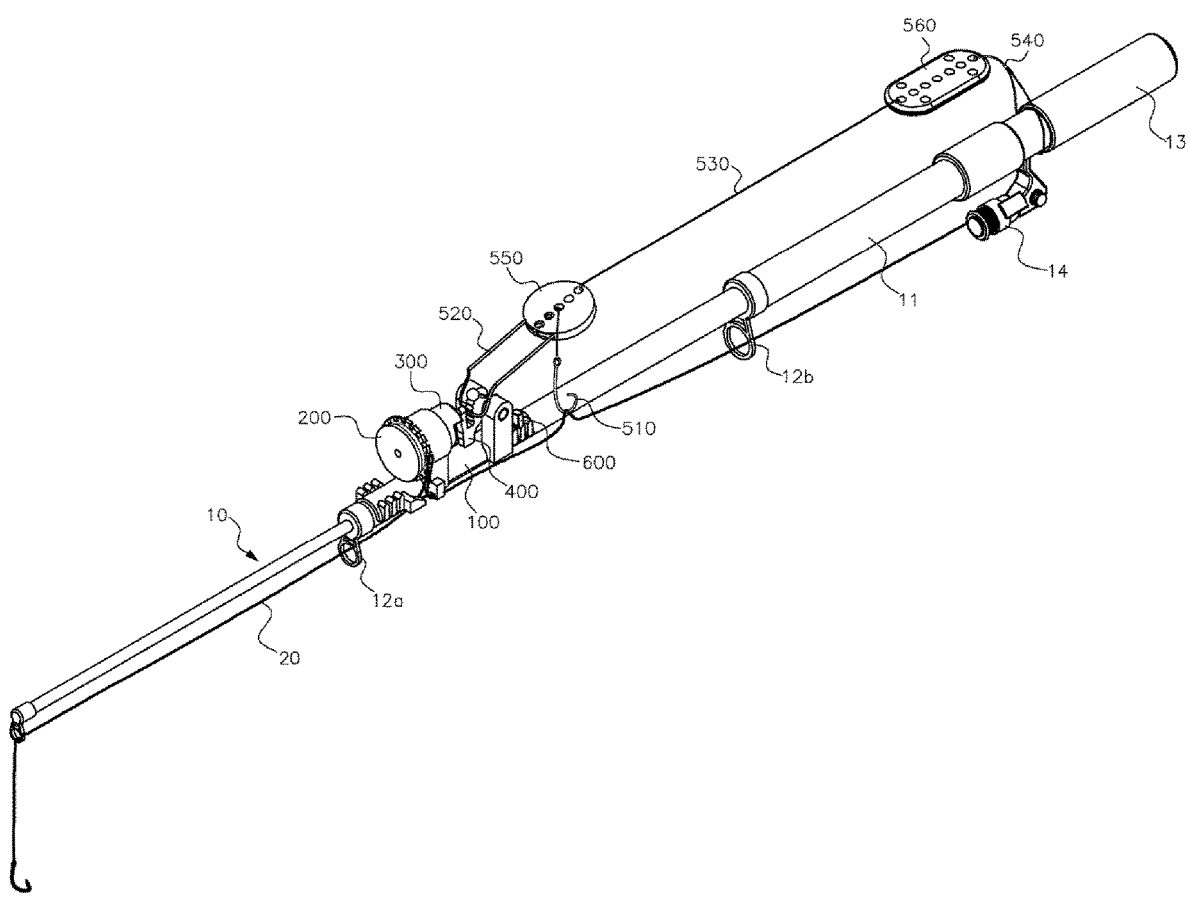
FIG. 5 is a state diagram showing an actual example of the automatic jerking device for fishing of the first embodiment.
Figure 6:
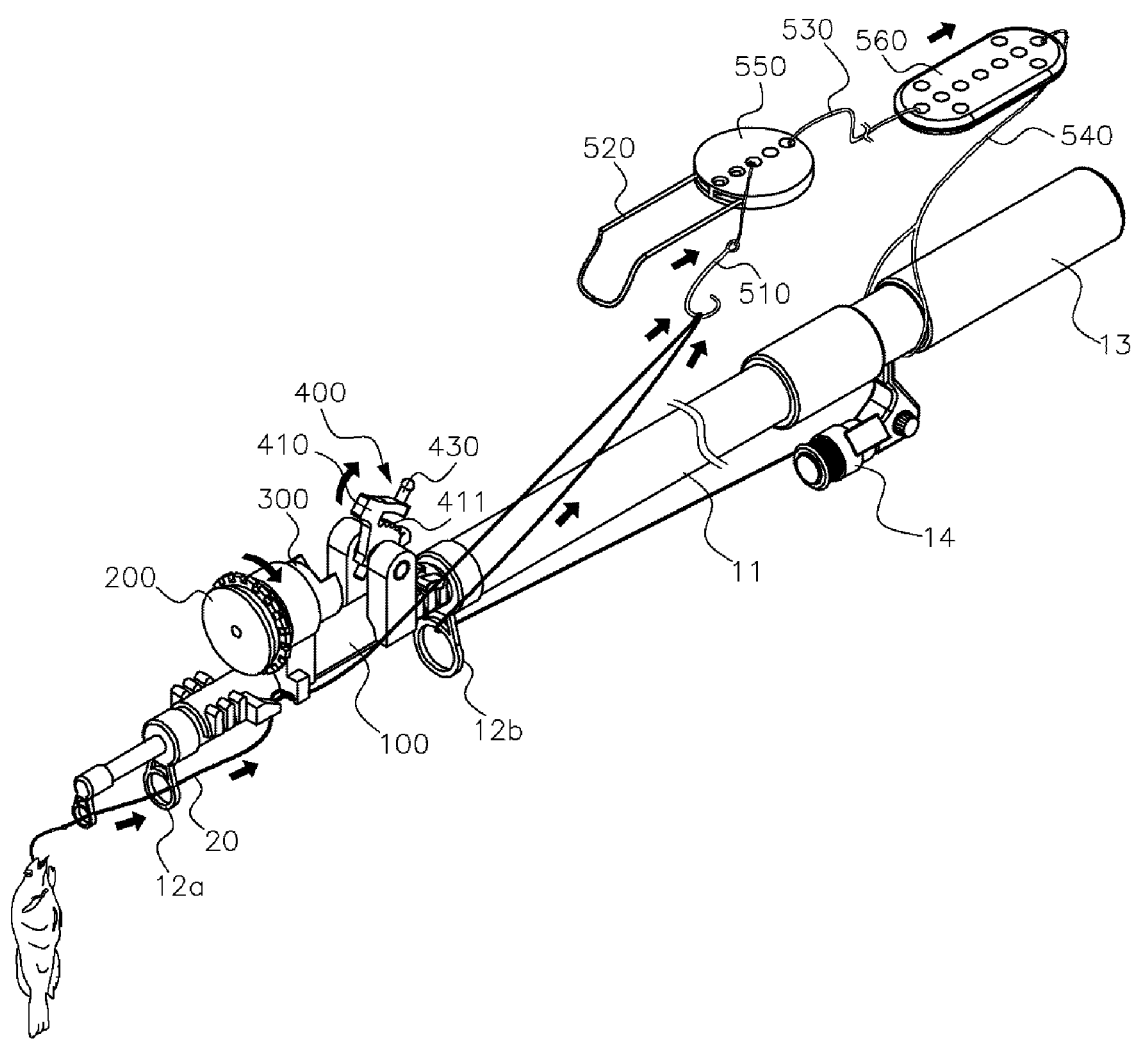
FIG. 6 is a view showing an operation process of a jerking of the first embodiment.

FIGS. 3 and 5 are exemplary views showing operation steps of the first embodiment according to the present invention.

In the present invention, the bite of the fish cause the fishing line caught by the protrusion 210 of the biting signal detection member 200 to rotate the biting signal detection member 200.

As the biting signal detection member 200 is rotated, the rotation switch 300 integrally connected thereto is rotated, so that the blocking portion 320 and the opening portion 310 of the rotation switch 300 are rotated. The blocking portion 320 having been blocking the movable stick 430 of the trigger 400 is removed by the rotation of the rotation switch 300.

When the blocking portion 320 and the opening portion 310 are rotated, the movable stick 430 having been blocked by the blocking portion 320 is separated at the time when the blocking portion 320 is switched to the opening portion 310. When the movable stick 430 is separated, the trigger 400 is separated as if bounced while being rotated around the second rotation shaft 420 by the contraction force of the connection portion 550 connected by the elastic wire 530.

Next, the latch 520 mounted on the latch protrusion 411 has no place to be supported when the trigger 400 is rotated, the connection with the latch protrusion 411 is released and rapidly retracted rearward due to the contraction of the elastic wire 530. Thus, the jerking is performed.

The towing hook 510 and the latch 520 are connected to the elastic wire 530 through the connection portion 550, and the elastic wire 530 may be preferably connected to a fixing strap 540 through a fixing portion 560 and fixed to the grip 13 or the like of the fishing rod, but may be directly connected thereto.

The elastic wire 530 and the fixing portion 560 are fastened to each other in a manner of easily adjusting the length of the elastic wire, such as forming a knot at the elastic wire, or placing a wire fixture on the fixing portion.

As an example, the length of the elastic wire may be easily adjusted according to a position of the knot formed on the elastic wire. Since the jerking strength and the jerking length are adjustable according to the length of the elastic wire and the position where the elastic wire is fixed to an outer peripheral surface of the fishing rod, it is one of the important factors of the present invention that the length of the elastic wire 530 is easily adjustable.

The fishing line twice in length is pulled at the end of the fishing rod with respect to the length pulled by the towing hook 510, so that the jerking may be effectively performed, and the fish during jerking may be effectively prevented from being missed. The present invention is configured to adjust the length of the elastic wire through the connection portion 550 or the fixing portion 560, thereby enabling the jerking force and the jerking length to be adjusted.

Meanwhile, according to the present invention, a stopper 460 axially supported by a third shaft support portion 150 is provided at a rear of the trigger 400. The stopper 460 is configured to interfere with a stopping protrusion 450 formed at a rear end of the rotation member 410 to prevent further rotation of the rotation member 410, so that the jerking is prevented from being generated in a ready stage.

Figure 7:
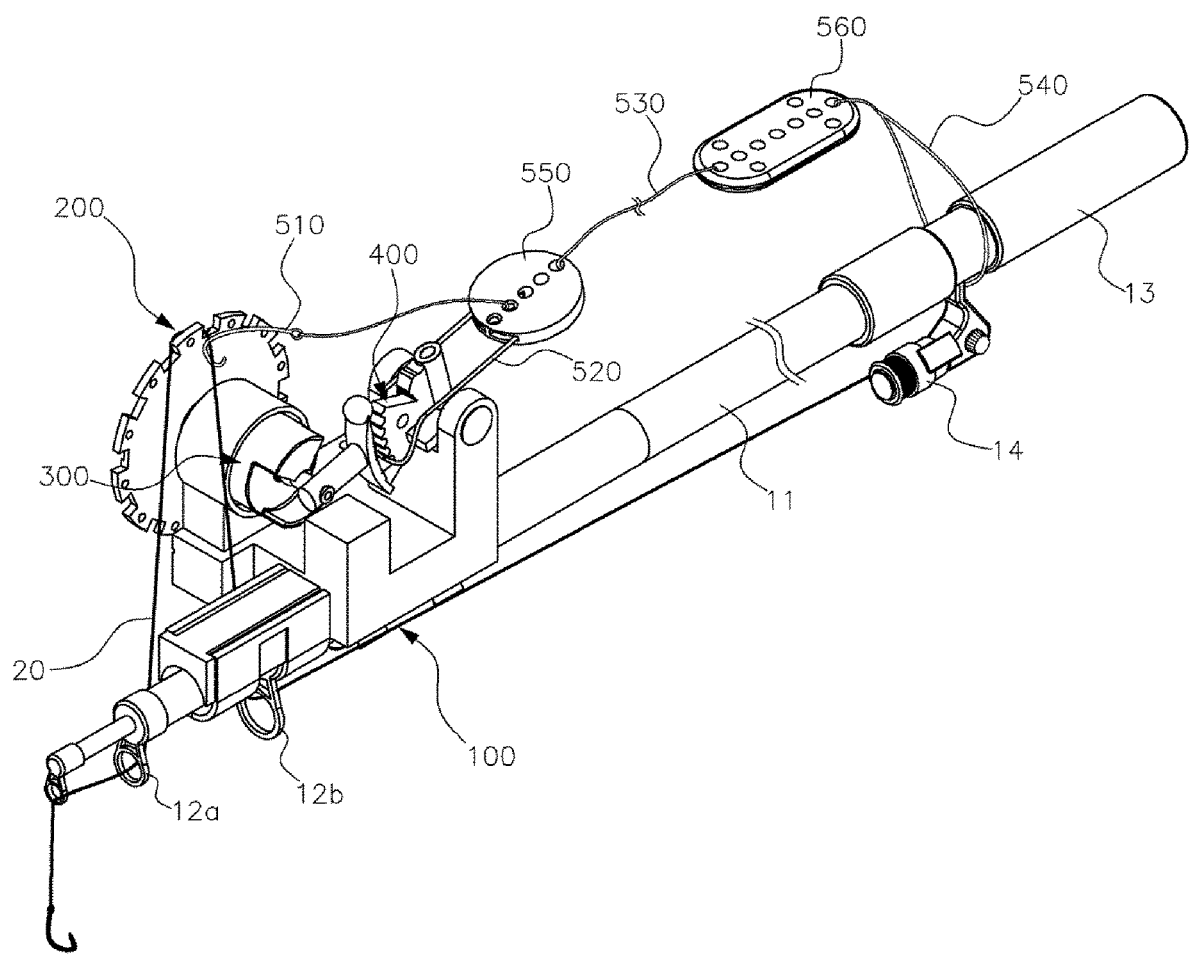
FIG. 7 is a view showing another embodiment modified from the first embodiment.

FIG. 7 shows a modification of an arrangement direction of the first rotation shaft 210 of the biting signal detection member 200, the first shaft support portion 120, and the rotation switch 300, and the practical functions and effects are the same as the first embodiment shown in FIGS. 1 to 6.

Figure 8:
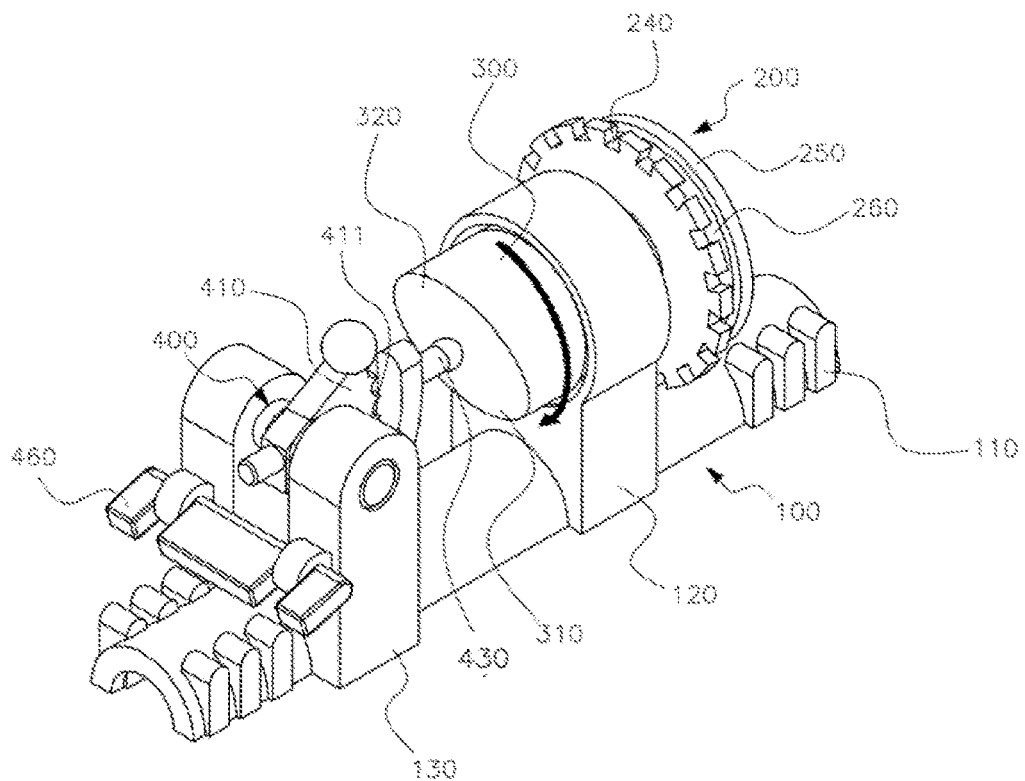
FIG. 8 is a view showing a modified form of a rotation switch of the first embodiment.
Figure 8:
Figure 8:
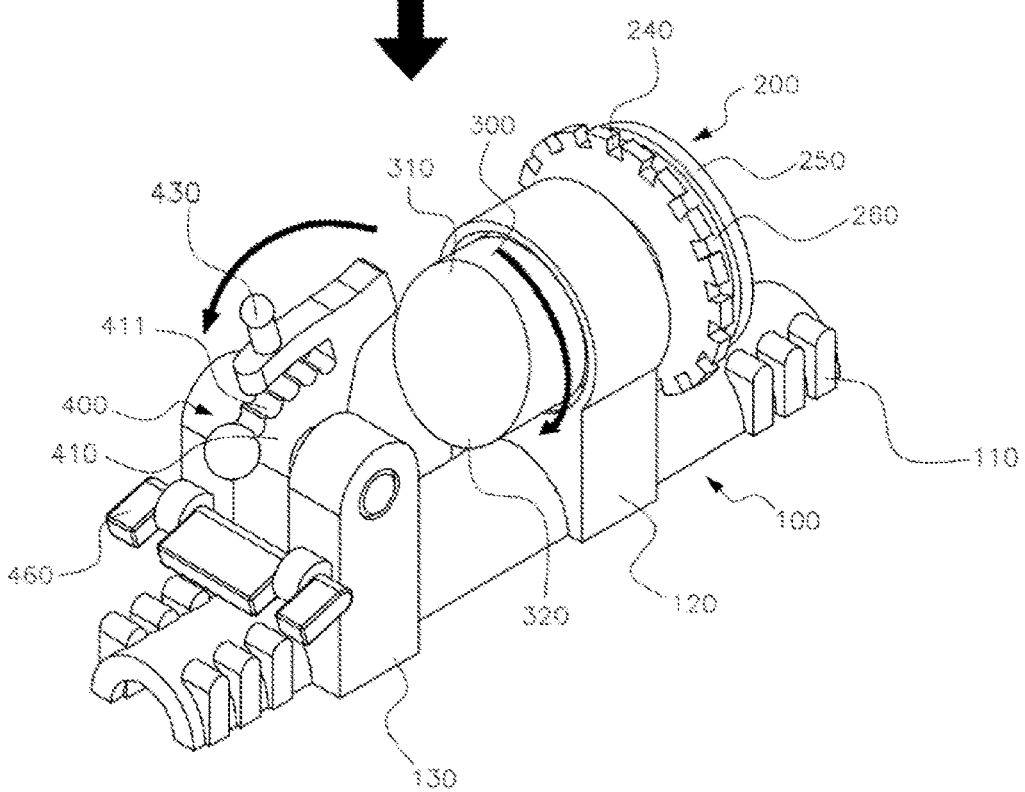

FIG. 8 shows a modification of the structure of the rotation switch 300 in the first embodiment. Likewise, the opening portion 310 and the blocking portion 320 are provided.

Hereinafter, a second embodiment with reference to the accompanying drawings will be described in addition to the above best mode for embodiments.

Figure 9:
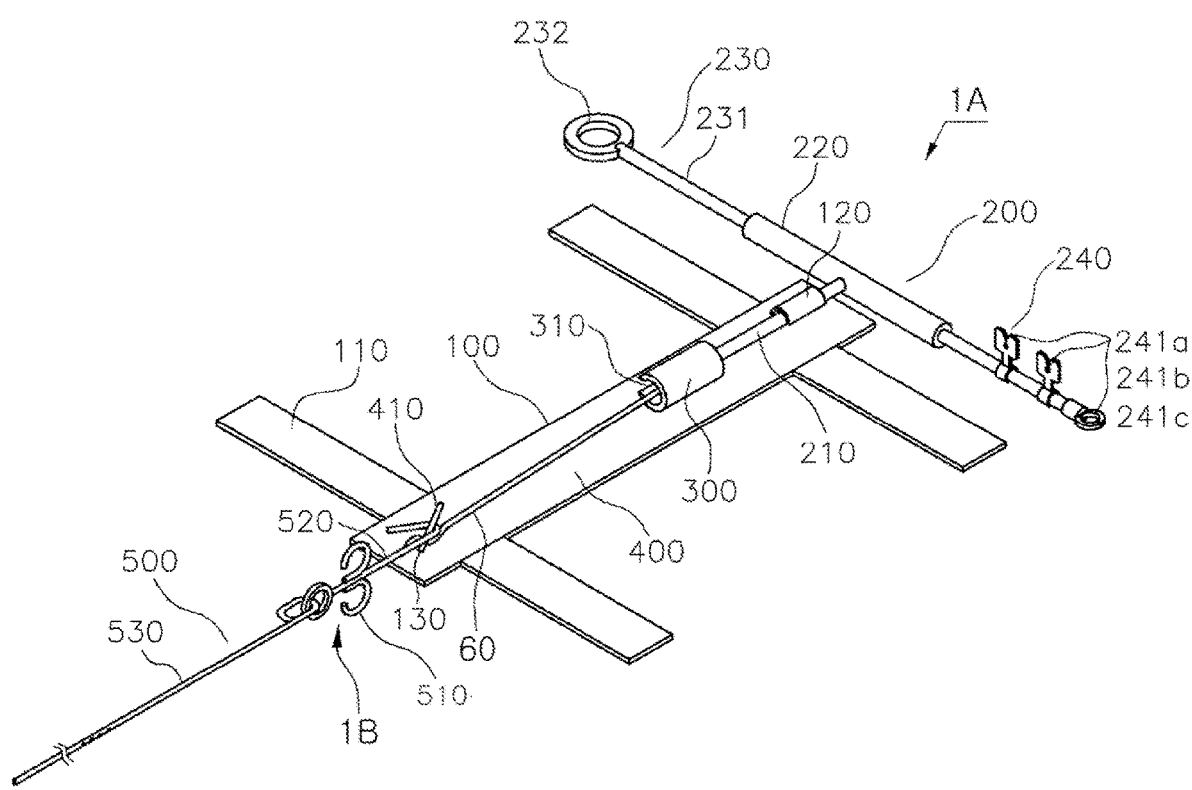
FIG. 9 is an exemplary view showing an automatic jerking device for fishing of a second embodiment according to the present invention.
Figure 10:
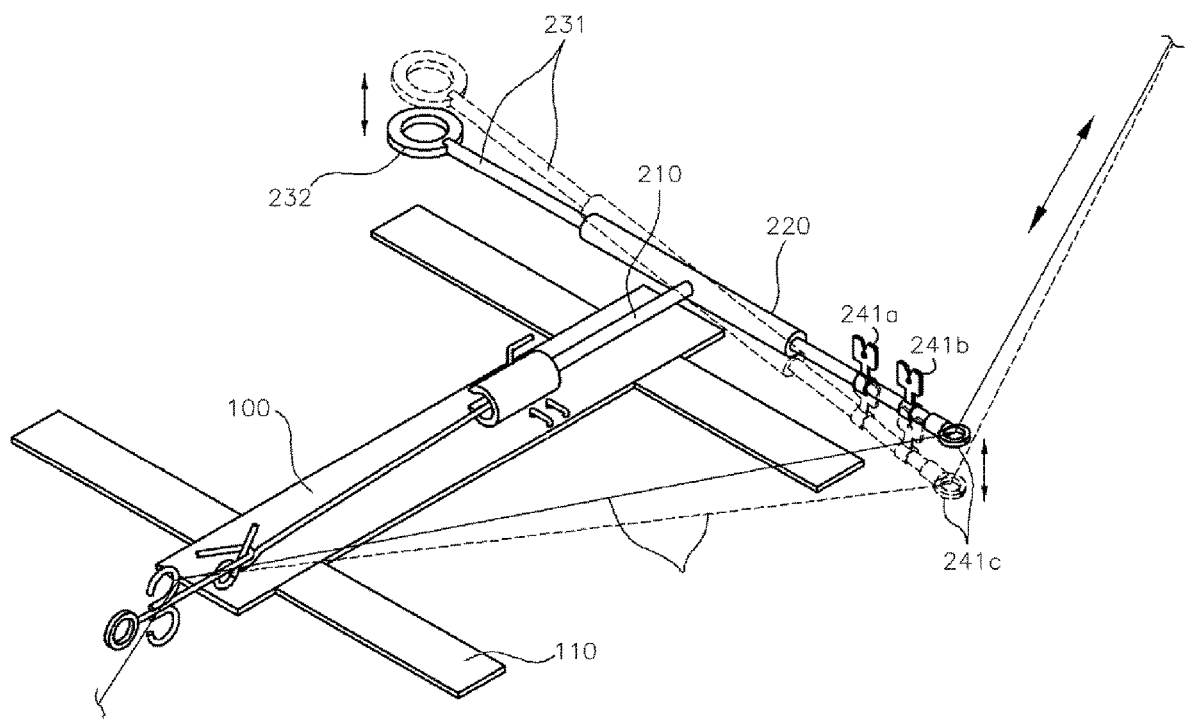
FIG. 10 is an enlarged side view of a biting signal detection member of the second embodiment.
Figure 11:
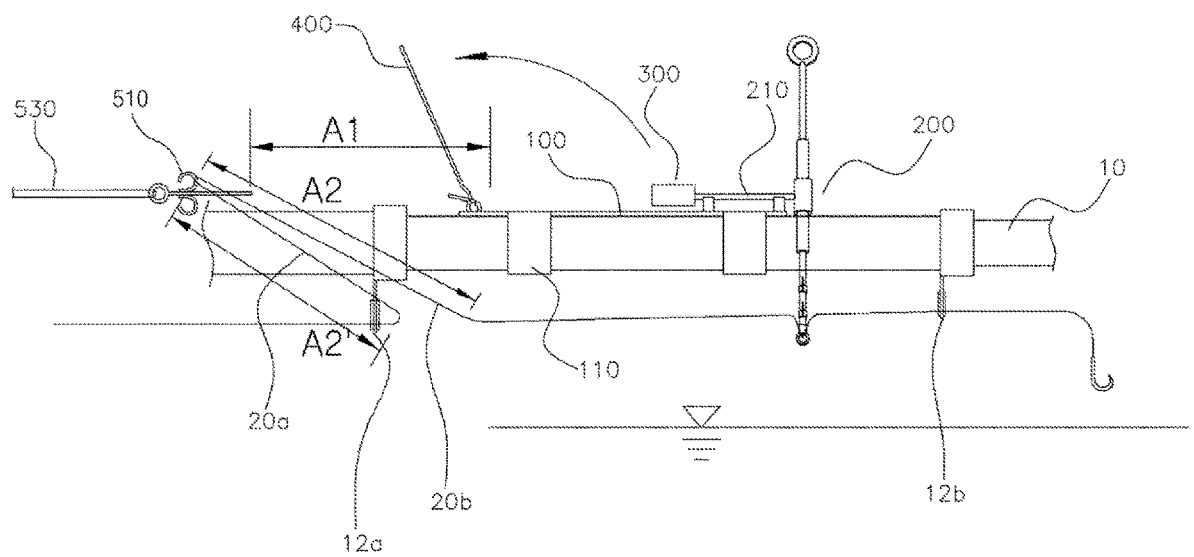
FIG. 11 is a view for explaining a jerking principle upon operation of the automatic jerking device for fishing according to the second embodiment.

As shown in FIGS. 9 to 11, an automatic jerking device for fishing of another embodiment according to the present invention including a biting signal detection portion 1A includes a base 100 fixed to the upper part of the fishing rod, a biting signal detection member 200 freely rotatably provided to a front of the base 100, a rotation switch 300 integrally rotated together with the biting signal detection member 200, a trigger 400 that has one end mounted to the rotation switch 300 and is rotated while being separated from the switch 300 by rotation of the switch 300, and a jerking member 500 mounted to the trigger 400 to perform a jerking to a rear of the fishing rod while pulling a fishing line by the rotation trigger 400.

The base 100 has a coupling portion 110 detachably coupled to the fishing rod 10 in the longitudinal direction, and has a first shaft support portion 120 for rotatably supporting the biting signal detection member 200 and a second shaft support portion 130 for rotatably supporting the trigger 400.

The base 100 may be formed of metal or synthetic resin, and may have a semicircular shape one side of which is open, in addition to the flat plate shape, so that both ends of the base may be detachably fitted to the outer circumferential surface of the fishing rod 10 by the elastic restoring force so as to come into a close contact with the outer circumferential surface of the fishing rod 10.

The coupling portion 110 is arranged in opposite directions at edges of the base 100 to surround the outer circumference of the fishing rod and both ends of the coupling portion 110 are coupled to each other, so that the base 100 is fixed to the fishing rod.

The biting signal detection member 200 includes a first rotation shaft 210, in which the first rotation shaft 210 is rotatably supported by the first shaft support portion 120. The biting signal detection member 200 includes a biting signal detection rod 220 installed in a transverse direction at a front end of the first rotation shaft 210. At least one end of the biting signal detection rod 220 is provided with a fishing line latching portion 240. The fishing line latching portion 240 is movably coupled to one side of the biting signal detection rod 220, in which at least one movable protrusion 241a, 241b and 241c is provided to have a gate through which the fishing line 20 enters and exits.

The biting signal detection rod 220 may be separately formed with a biting signal control rod 230 at the other end thereof. The biting signal control rod 230 includes a moving support member 231 and a weight portion 232 to more precisely control the above-described bite sensitivity.

The movable support member 231 is inserted into the biting signal detection rod 220 to adjust a length thereof, and the weight portion 232 is provided at a position opposite to the other end of the moving support member 231, more specifically, at a position opposite to the fishing line latching portion 240 so as to be detachably coupled to the weight.

The second embodiment according to the present invention, in addition to the biting signal detection portion 1A for fishing, includes an automatic jerking device 1B for fishing, which has a rotation switch 300, a trigger 400, and a jerking member 500. However, the configuration of the biting signal detection portion 1A for fishing will be additionally described for describing the operation state of the automatic jerking device 1B.

The rotation switch 300 may be provided at the other end of the rotation shaft 210 of the biting signal detection member 200 such that a shape of a section facing upward varies according to the rotation angle while rotating integrally with the rotation shaft 210. In the first embodiment, the rotation switch 300 is rotated in conjunction with the rotation of the rotation shaft 210, in which a position of an entrance 310 is changed.

In other words, the rotation switch 300 is rotated in the same direction as the rotation direction of the first rotation shaft 210 when the bite of the fish occurs. Accordingly, the position of the entrance 310 is disposed upward to communicate with the outside or disposed downward to be isolated from the outside.

A front end of the trigger 400 is configured to be accessible to the inside and outside of the rotation switch through the entrance 310 of the rotation switch 300, and a rear end 420 is configured to be rotatable about the second rotation shaft while being supported by the second shaft support portion 130 of the base 100.

The rear end of the trigger 400 rotatably supported with respect to the second shaft support portion 130 is further provided with a latch protrusion 410 so as to be rotated with respect to the first shaft support portion 130. The latch protrusion 410 protrudes upward from the rear end of the trigger 400 and awaits after being latched by a latch 510 provided at a front end of the jerking member 500 described later. The front end of the trigger 400 is mounted to the rotation switch 300, such that the latch 510 escapes the latch protrusion 410 by the contraction force of the elastic wire 530 described later, when the front end is separated to the outside through the entrance 310 of the rotation switch 300.

The jerking member 500 has one side caught by the fishing line, and the rotation switch 300 is rotated when a strong bite occurs during standby while the jerking member 500 is caught by the latch protrusion 410. Accordingly, when the trigger 400 is discharged (rotated) to the outside through the entrance 310 of the rotation switch 300, the jerking is performed by pulling rearward the fishing line caught on the one side. To this end, the jerking member 500 includes a latch 510 detachably mounted to the latch protrusion 410, and an elastic wire 530 extending and connected from the towing hook 520 by which the fishing line is caught.

The elastic wire 530 has one end connected to the latch 510 and the towing hook 520 so as to form an elastic force that pulls the latch 510 and the towing hook 520 toward the user or the reel wound by the fishing line and coupled to the fishing rod, and the other end fixed to the rear of the fishing rod.

The operation of the second embodiment according to the present invention will be described in detail.

The automatic jerking device 1B according to the present invention is disposed between a first butt guide 12a and an adjacent second butt guide 12b provided on the fishing rod 10. Thereafter, the fishing line 20 between the first butt guide 12a and the second butt guide 12b is ready after hooked to the towing hook 520 of the automatic jerking device 1B. According to the automatic jerking device 1B, when the trigger 400 is separated from the rotation switch 300 while the rotation switch 300 is rotated by the strong bite, the trigger 400 is pulled by the elastic force, the latch 520 caught by the latch protrusion 410 of the trigger 400 moves rearward through the elastic force of the elastic wire 530, and simultaneously the towing hook 520 pulls the fishing line.

Thus, the jerking is achieved.

When the jerking occurs in the above manner, the automatic jerking device 1B pulls the fishing line toward the reel, in which the fishing line 20a between the first butt guide 12a and the automatic jerking device 1B, and the fishing line 20b between the automatic jerking device 1B and the second butt guide 12b are simultaneously pulled, so that the length of the fishing line A2 and A2' pulled is doubled compared to the distance A1 that the automatic jerking device 1B moves.

The present invention may have the industrial applicability in that the bite, which is important in fishing, is detected and the jerking is automatically performed at the optimal timing to prevent the bait from being snatched, so that the fishing efficiency is increased.

The invention claimed is:

1. An automatic jerking device for fishing, the automatic jerking device comprising:
    a base (100) mounted on a fishing rod;
    a biting signal detection member (200) rotatably installed on the base (100) and including a protrusion (240) on which a fishing line is placed;
    a trigger (400) installed on the base (100) to interwork according to the rotation of the biting signal detection member (200) and including a latch protrusion (411);
    a rotation switch (300) coupled to the biting signal detection member (200) provided between the biting signal detection member (200) and the trigger (400) to switch the trigger (400) while being rotated in conjunction with the rotation of the biting signal detection member (200), wherein the rotation switch (300) holds or releases a movable stick (430) of the trigger while being rotated in conjunction with the rotation of the biting signal detection member (200);
    a latch (520) mounted to the latch protrusion (411) of the trigger (400); and
    a towing hook (510), on which the fishing line is placed, connected with the latch (520);
    an elastic wire (530) with one end connected to the latch (520) and an opposite end connected to the fishing rod, wherein the towing hook (510) pulls the fishing line rearward upon a biting signal detection.

2. The automatic jerking device of claim 1, wherein the rotation switch (300) for blocking or releasing the movable stick (430) while being rotated in conjunction with the rotation of the biting signal detection member (200) is formed on an outer circumferential surface thereof with an opening portion (310) and a blocking portion (320).

3. The automatic jerking device of claim 2, wherein the rotation switch (300) has a hollow inner surface, and includes the opening portion (310) and the blocking portion (320) at outer circumference thereof, in which the blocking portion (320) includes a first blocking portion (321) having a large radial thickness and a second blocking portion 322 having a small radial thickness.

4. The automatic jerking device of claim 1, wherein the base (100) includes a first guide (140a) and a second guide (140b) for guiding the fishing line.

5. The automatic jerking device of claim 1, wherein the biting signal detection member (200) includes a disc (220) formed on an outer circumference thereof with the protrusion (240), in which a spool (250) is added to a front surface of the disc (220), and a groove (260) is formed along an outer circumference between the disc (220) and the spool (250).

6. The automatic jerking device of claim 5, wherein the spool (250) is loosened or tightened to adjust a rotation sensitivity of the biting signal detection member (200), so that a response sensitivity to a bite of a fish is adjusted.

7. The automatic jerking device of claim 1, wherein, the base (100) further includes a shaft support portion at a rear of the trigger (400), and a stopper is rotatably provided in the shaft support portion, so that the stopper interferes with a stopping protrusion (450) formed at a rear end of a rotation member (410) to prevent a jerking from unintentionally occurring.

8. The automatic jerking device of claim 1, wherein the base (100) includes a coupling portion (110) formed with a coupling groove, and an elastic silicone wire (111) is inserted into the coupling groove, so that the base (100) is firmly fixed to the fishing rod.

9. The automatic jerking device of claim 1, wherein the latch protrusion (411) is formed on a rotation member (410) of the trigger (400) and includes a plurality of latch protrusions (411) that are vertically arranged, so that a jerking sensitivity is adjustable according to a height of the latch protrusions.

10. The automatic jerking device of claim 1, wherein the biting signal detection member (200) includes a biting signal detection rod (220) having a rod shape rotated along a first rotation shaft, in which at least one side of the biting signal detection rod (220) is formed with the protrusion (241) on which the fishing line is caught.

* * * * *